United States Patent [19]

Tobe

[11] Patent Number: 4,969,135
[45] Date of Patent: Nov. 6, 1990

[54] SYSTEM OF ALTERNATELY OPERATING DISK PLAYERS

[75] Inventor: Takeo Tobe, Saitama, Japan
[73] Assignee: Pioneer Electronic Corporation, Tokyo, Japan
[21] Appl. No.: 117,763
[22] Filed: Nov. 6, 1987

[30] Foreign Application Priority Data

Nov. 12, 1986 [JP] Japan ................................ 61-269456

[51] Int. Cl.$^5$ ............................................ H04B 1/20
[52] U.S. Cl. ......................................... 369/2; 360/61; 360/13
[58] Field of Search .................... 369/1, 2, 30, 32, 198, 369/47, 48, 50; 360/61, 71, 74.1, 74.4, 12, 13, 14.3

[56] References Cited

U.S. PATENT DOCUMENTS

| | | | |
|---|---|---|---|
| 4,283,745 | 8/1981 | Kuper et al. | 360/14.3 |
| 4,321,632 | 3/1982 | Leis et al. | 360/74.4 |
| 4,495,607 | 1/1985 | Nishida | 360/74.4 |
| 4,754,342 | 6/1988 | Duffy | 360/14.3 |

FOREIGN PATENT DOCUMENTS 8201784  5/1982  World Int. Prop. O. ......... 360/74.4

Primary Examiner—Stuart S. Levy
Assistant Examiner—Hoa Nguyen
Attorney, Agent, or Firm—Sughrue, Mion, Zinn, Macpeak & Seas

[57] ABSTRACT

In a system of alternately operating a plurality of disk players, when the pickup of a first one of the disk players comes near the last address of the last address of the last of the pieces of music recorded, as data signals on a data recording disk, a second disk player is activated so that it is in standby state at the beginning of a piece of music which is the first in the order of pieces of music to be played by the second disk player. Immediately after the last address of the last piece of music is read by the first disk player, the second disk player is caused to play the piece of music.

5 Claims, 4 Drawing Sheets

FIG. 4B

| | | ORDER OF PLAY OF PLAYERS N | | | | |
|---|---|---|---|---|---|---|
| | | 1 | 2 | ---- | ----- | n |
| | | PL₃ | PL₅ | | | PL₈ |
| ORDER OF PIECE OF MUSIC M | M₁ | No. 6 | No. 2 | | | No. 3 |
| | M₂ | No. 3 | No. 5 | | | No. 9 |
| | ⋮ | ⋮ | ⋮ | | | ⋮ |

4,969,135

SYSTEM OF ALTERNATELY OPERATING DISK PLAYERS

BACKGROUND OF THE INVENTION

This invention relates to a system of alternately operating a plurality of disk players (hereinafter referred to as "a disk player alternate operation system", when applicable).

A system of alternately operating a plurality of disk players is well known in the art in which a plurality of disk players are selectively operated. The output is then reproduced by means of a single power amplifier, loudspeaker or a CRT (cathode ray tube). One example of a conventional disk player alternate operation system of this type will be described with reference to FIG. 1.

As shown in FIG. 1, in response to operation start signals from play control units 3 and 4, disk players 1 and 2 read audio data signals and video data signals from data recording disks such as DADs (digital audio disks) or video disks and demodulate them. The output signals of the disk players 1 and 2 are applied to respective input terminals of a switching unit 5. The output data signals of the disk players 1 and 2 are further applied to respective lead-out detecting circuits 6 and 7. Upon detection from the data signal of a lead-out signal indicating that the pickup has reached the lead-out area of the disk, each of the lead-out detecting circuits 6 and 7 outputs a lead-out detection signal which is applied to both the play control units 3 and 4.

The first play control unit 3 supplies an operation stopping signal to the first player 1 in response to the lead-out detection signal from the first lead-out detecting circuit 6 and, in response to the lead-out detection signal from the second lead-out detecting circuit 7, activates the first player 1 and simultaneously supplies a change-over instruction signal to cause the switching circuit 5 to select the data signal provided by the first player 1. Similarly, the second play control unit 4 supplies an operation stopping signal to the second player 2 in response to the lead-out detection signal from the second lead-out detecting circuit 7 and, in response to the lead-out detection signal from the first lead-out detecting circuit 6, activates the second player 2 and simultaneously supplies a change-over instruction signal to cause the switching circuit 5 to select the data signal outputted by the second player 2. The data signal thus selected by the switching circuit 5 is reproduced as a sound output or video output by a single signal reproducing system (not shown).

The operation of the disk player alternate operation system thus organized will be described in more detail.

When the operation instruction is made with the power switch of the system being turned on by the operator, the operation start signal is supplied to the first player 1 by the first play control unit 3 so that the first player 1 is operated. At the same time, the change-over instruction signal is supplied to the switching circuit 5 by the first play control unit 3, as a result of which the data signal provided by the first player 1 is supplied to the signal processing circuit thus being reproduced as an audio or video output.

On the other hand, the first player 1 reads data signals out of the data recording medium successively. When the first player 1 reads the last piece of music (the term "music" as used herein is intended to mean a single piece of music or a group of data including various events) and reads the lead-out signal indicating the end of the data, the first lead-out detecting circuit 6 detects it to provide the lead-out detection signal. In response to this lead-out detection signal, the second play control unit 4 supplies the operation start signal to the second player 2 to start it. At the same time, the second play control unit 4 supplies the change-over instruction signal to the switching unit 5 to apply the output data signal of the second player 2 to the signal processing circuit. On the other hand, in response to that lead-out detection signal, the first play control unit 1 applies the operation stopping signal to the first player 1 to stop it. That is, the first player 1 is placed in the initial state. When the operation of the first player 1 is ended in this manner, the second player 2 is started. Similarly, when the operation of the second player 2 is ended, the first player is activated.

In the above-described conventional system, the period of time which elapses from the time instant that the operation of one of the players is ended until the other player starts its operation is relatively long, as a result of which the condition that no sound or picture is reproduced lasts for a relatively long period of time whenever the operations of the players are switched over to each other.

SUMMARY OF THE INVENTION

Accordingly, an object of this invention is to provide a system of alternately operating a plurality of disk players in which the above-described difficulty that no sound or picture is reproduced for a relatively long period of time whenever the operations of the players are switched over to each other has been eliminated.

The foregoing object and other objects of the invention have been achieved by the provision of a system of alternately operating a plurality of disk players in which at least two disk players are operated one at a time and their outputs are applied through a switching relay to a single reproducing system. According to the invention, a play start position and a play instruction are given to a first one of the disk players, the present address provided by the first disk player is compared with the last address of the last piece of music to be played by the first disk player, and when the address difference is a predetermined value or less, a play start preparation instruction is applied to a second one of the disk players.

The manner in which the foregoing object and other objects are achieved by this invention will become more apparent from the following detailed description when read in conjunction with the accompanying drawings.

BRIEF DESCRIPTION OF THE DRAWINGS

In the accompanying drawings:

FIG. 4B is an explanatory diagram showing one example of a play program.

DETAILED DESCRIPTION OF THE PREFERRED EMBODIMENTS

A first example of a disk player alternate operation system according to this invention will be described with reference to FIG. 2.

Figure 1:
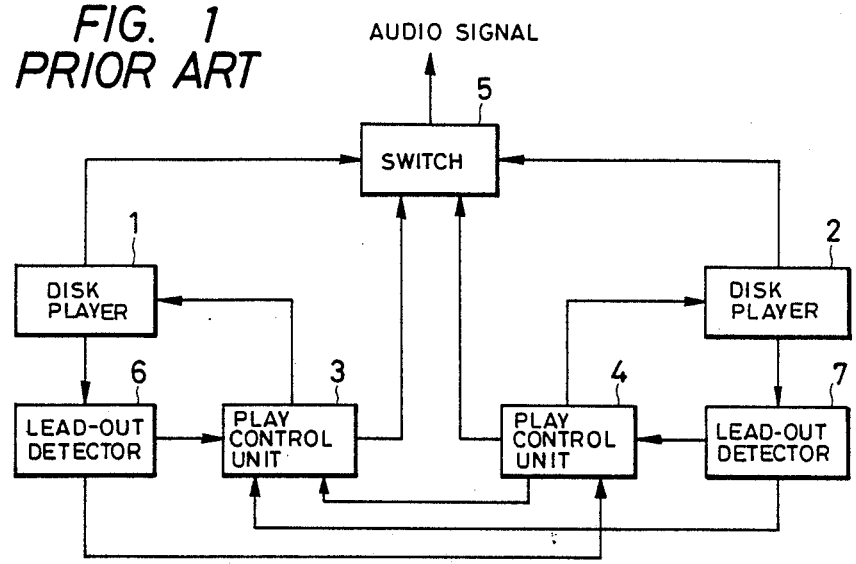
FIG. 1 is a block diagram showing a conventional system of alternately operating a plurality of disk players.
Figure 2:
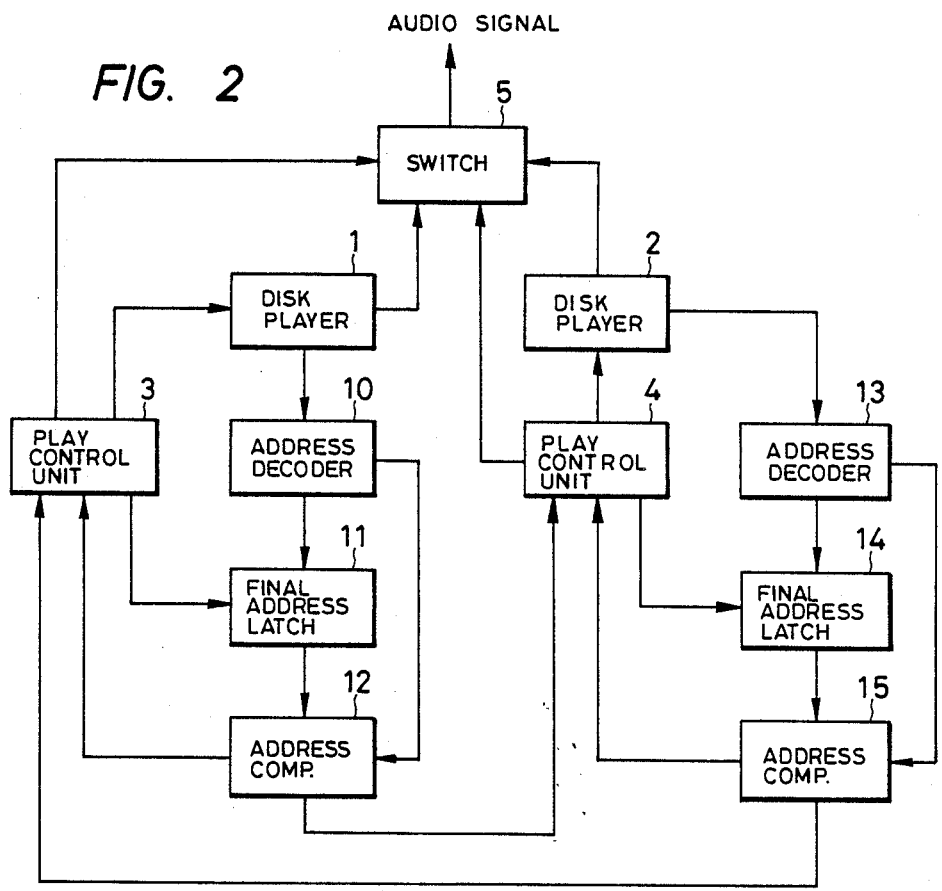
FIG. 2 is a block diagram showing a first example of a system of alternately operating a plurality of disk players.

In FIG. 2, those circuit elements which have been previously described with reference to FIG. 1 are therefore designated by the same reference numerals. The data signal read from the recording medium by the first player 1 is supplied to an address decoder 10. The address decoder 10 extracts an address signal from the data signal and supplies it to a final address latch 11 and an address comparison circuit 12. The final address latch circuit 11, in response to a latch instruction signal supplied from the first play control unit 3 during a search operation, stores the address signal supplied successively thereto. In the address comparison circuit 12, the value of the current (present) address signal received from the address decoder 10 is compared with the value of the final address latch circuit 11. When the difference between the present address and the final address is a predetermined value or less, the comparison circuit 12 applies a first detection signal to the second play control unit 4. When the value of the present address signal coincides with that of the final address signal, the comparison circuit 12 applies a second detection signal to both the play control units 3 and 4.

The data signal read from the recording medium by the second player 2 is supplied to an address decoder 13. The address decoder 13 extracts an address signal from the data signal and supplies it to a final address latch circuit 14 and an address comparison circuit 15. The final address latch circuit 14, in response to a latch instruction signal supplied from the second play control unit 4 during a search operation, stores the address signal supplied successively thereto. In the address comparison circuit 15, the value of the present (current) address signal supplied from the address decoder 10 is compared with the value of the final address signal stored in the final address latch circuit 14. When the difference between the present address and the final address is a predetermined value or less, the comparison circuit 15 supplies the first detection signal to the first play control unit 3. When the value of the present address coincides with that of the final address, the comparison circuit 15 supplies the second detection signal to both the play control units 3 and 4.

In response to the first and second detection signals, the first play control unit 3 provides a start instruction signal and a play start instruction signal, respectively, which are applied to the first disk player 1. Similarly, in response to the first and second detection signals, the second play control unit 4 provides a start instruction signal and a play start instruction signal, respectively, which are applied to the second disk player 2. Each of the play control units 3 and 4 applies the change-over instruction signal to the switching unit 5 in response to the second detection signal. The remaining arrangement is similar to that of the conventional system shown in FIG. 1.

The operation of the system thus organized will be described.

When the operator issues an operation instruction after turning on the power switch of the system, the first play control unit 3 applies the start instruction signal to the first player 1 and supplies the latch instruction signal to the final address latch circuit 11. In response to the start instruction signal, the first player 1 starts its operation. Consequently, the first player 1 searches the data recording medium to read the data up to the final address. The final address thus read is stored in the final address latch circuit 11. In the first player 1, after the search mentioned above, the pickup is returned to the beginning of the first piece of music to read the music data to allow the reproduction (performance) to start. At the same time, the change-over instruction signal is applied to the switching unit 5 so that the output signal of the first player 1 is selected. The demodulated data signal is supplied through the switching unit 5 to a signal processing circuit so as to be reproduced.

The reproduction is continued in this manner. Thereafter, when a predetermined address value preset in the address comparison circuit 12 in correspondence to a period of time necessary for starting the second player 2 and for searching for the final address is read, the address comparison circuit 12 outputs the first detection signal. That is, the first detection signal is output when near the final address an address value is read with the time interval between the reading time instants of the two addresses being equal to the above-mentioned necessary period of time. In response to the first detection signal, the second play control unit 4 applies the search instruction signal, to the second player 2 and the latch instruction signal to the final address latch circuit 14. In response to the search instruction signal, the second player 2 starts a searching operation, as a result of which the final address of the last piece of music is stored in the final address latch circuit 14. Thereafter, the second player 2 returns its pickup and it is placed in a standby state with the play start address.

The reproduction is further continued. When the final address is read, the second detection signal is outputted by the address comparison circuit 12. In response to the second detection signal, the second play control unit 4 supplies the play start instruction signal to the second player 2 so that the player 2 is switched over from the standby state to the play state. At the same time, the second play control unit 4 supplies the change-over instruction signal to the switching unit 5 so that the output data signal of the second player 2 is transmitted to the following stage.

As is apparent from the above description, immediately after the operation of the first player 1 has been ended, the operation of the second player 2 is started. That is, in the case when the operation of the first player 1 is switched over to that of the second player 2, the period of time for which no sound or picture is produced is considerably short.

The preceding description is similarly applicable to the case where the operation of the second player 2 is switched over to that of the first player 1.

A second example of the system according to the invention which utilizes a micro-processor will be described with reference to FIG. 3.

Figure 3:
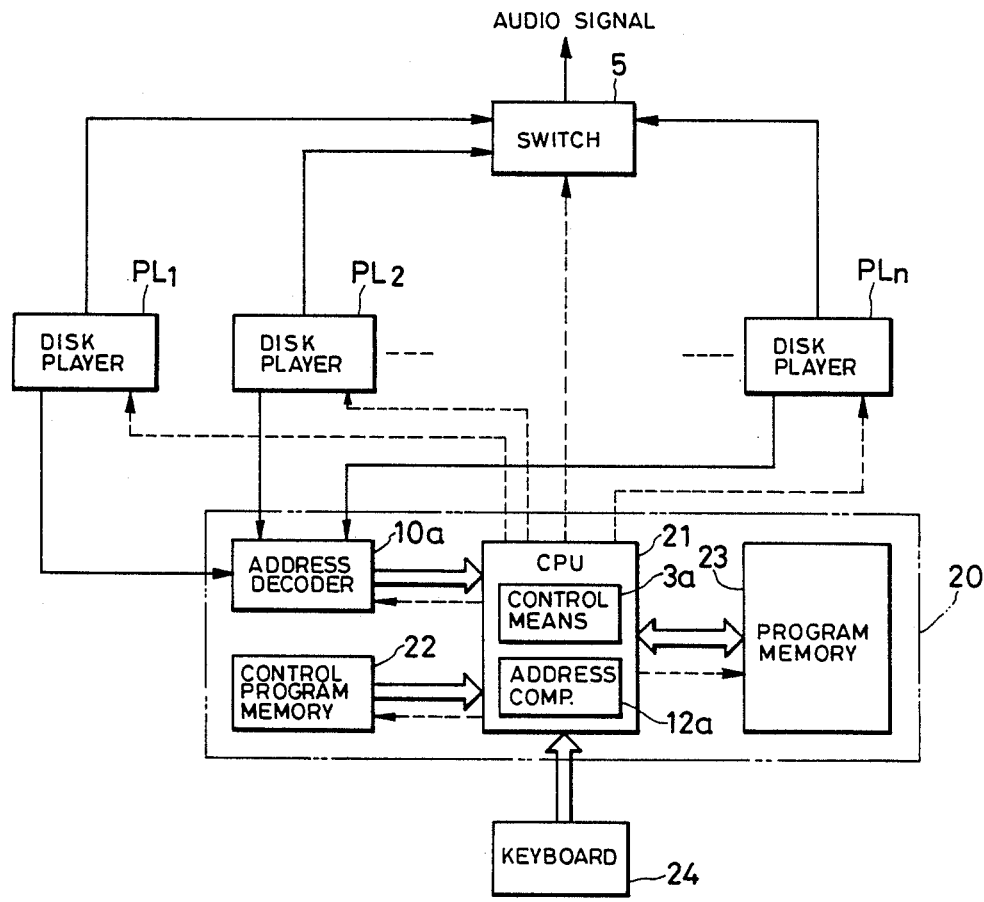
FIG. 3 is a block diagram showing a second example of the system according to the invention.

In FIG. 3, those circuit elements which have been described with reference to FIG. 2 are therefore designated by the same reference numerals. The outputs of players $PL_1$ through $PL_n$ are supplied to a switching decoder 10a. In response to an instruction from a CPU (central processing unit) 21, the address decoder 10a selects one of the data signals and extracts a data address signal therefrom. The address signal thus extracted is applied to the CPU 21. The CPU 21 includes control means 3a and address comparison means 12a. The control means 3a carries out control operations according to a control program stored in a program memory 23 and supplies instruction signals to various circuit elements in the system. The address comparison means 12a compares a predetermined address with the present address read by the pickup of a player. The control means and the address comparison circuit correspond respectively to the play control units 3 and 4 and the address comparison circuits 12 and 15.

A play program is inputted into the CPU 21 by means of a keyboard 24 and is stored in the program memory 23. The play program includes the order of play N (=1 . . . n) of the players $PL_1$ through $PL_n$, the order of pieces of music M for each player, and the addresses of the pieces of music. That is, the sequence of operating the players is stored in the memory 23. The CPU 21 receives the contents of the play program and controls the operations of the players $PL_1$ through $PL_n$ according to the control program.

Figure 4A:
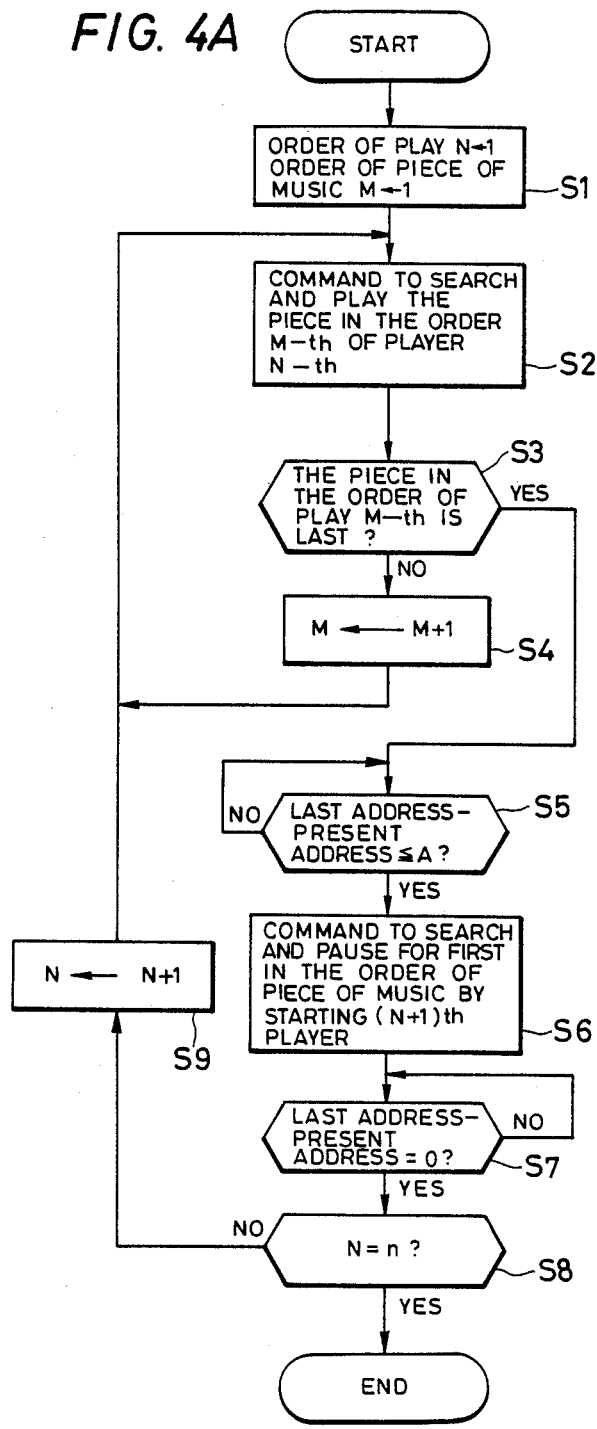
FIG. 4A is a flow chart for a description of the operation of the system shown in FIG. 3.

The operation of the system thus organized will be described with reference to the flow chart of FIG. 4A.

First, according to an input program (not shown), a play program is inputted by means of the keyboard 24. The play program is stored in the program memory 23 and it is not erased even if the power switch of the system is turned off. One example of the play program is as shown in FIG. 4B. The order of play of the players, $PL_3$, $PL_5$, . . . and $PL_8$, is listed in a line, and the order of pieces of music to be played by a player is listed in its respective column, for instance, No. 6, No. 3, . . . for the player $PL_3$ The terms "No. 6" and "No. 3" as used herein are intended to mean the sixth and the third pieces of music recorded on the recording medium.

When the system is activated with its power switch turned on, an initial value setting operation for inputting the contents of the play program is carried out (Step S1). As a result, the player $PL_3$, which is the first in the order of play of the players, is instructed to search for the piece of music No. 6 which is the first (or $M_1$-th) in the order of pieces of music, and to play it (Step S2). After the piece of music has been played, the next (or $M_2$-th) piece of music is set so as to be played (Steps S3 and S4). Under this condition, the player $PL_3$ is instructed to search for the $M_2$-th piece of music and to play it (Step S2). Steps S2 through S4 are repeatedly carried out to play the pieces of music as programmed. When the last piece of music to be played by the player $PL_3$ is reached (Step S3), the present address of the piece of music being played is compared with the last address of the last piece of music, and it is determined in Step S5 whether or not the address difference therebetween is a predetermined value A or less. The value A is determined according to the rise time and the search time of a player. When it is determined that the address difference is equal to the value A or less, then the player $PL_5$, which is the second in the order of play of the players, is caused to search for the piece of music No. 2 which is the first (or $M_1$-th) in the order of pieces of music, and to pause at the top of the piece of music No. 2 (Step S6). When it is detected from the coincidence of the present address with the last address when the last piece of music has been played (Step S7), it is determined whether the order of play N of the present play is n or not (N=n) (Step S8). If N does not equal n, the player $PL_5$ is released from the pause and instructed to start playing (Steps S9 and 1). Steps S2 through S9 are repeatedly performed in the above-described manner. When N=n is determined, the execution of the play program has been accomplished. Thus, the control operation is ended (Step S8).

As is apparent from the above description, the data signal supplied to the signal reproducing system is quickly switched from the output of the player which has finished its play over to the output of the next player which is in play state. Therefore, in the system of the invention, the period of time for which no sound or picture is reproduced when the operation of one disk player is switched over to that of another is practically sufficiently short when compared with that in the conventional system.

In the first example of the operation system of the invention, the player, after being started, carries out the searching operation to read the final address. However, if the operation system is so designed that the final address of the recording medium is inputted in advance, then the searching operation to read the address before the play can be eliminated. This method is effective in handling a recording disk which takes a relatively long period of time for the searching operation.

As was described above, in the system of alternating operating a plurality of disk players according to the invention, the play ending positions of all the disk players are stored, when the play of a first disk player is advanced until a predetermined position before the play ending position is read, a second disk player is placed in standby state, and simultaneously when the play of the first disk player is ended, the play of the second disk player is started. Therefore, the operation system of the invention is free from the difficulty that, as in the conventional system, when the operation of one disk player is switched over to that of another, no sound or picture is reproduced for the period of time required for starting the following disk player.

What is claimed is:

1. A system of alternately operating disk players, comprising:
    a plurality of disk players;
    switching relay means for receiving a plurality of signals, each signal in said plurality of signals being output from a respective one of said disk players, said switching relay means outputting one of said signals;
    first applying means for applying a play start position instruction and a play instruction to a first selected disk player of said plurality of disk players;
    comparing means for comparing a present address read from a disk mounted in said first selected disk player with a last address of a last piece of data to be played by said first selected disk player, said last address being provided by a search operation in response to said play start position instruction; and
    second applying means for applying a play start preparation instruction to a second selected disk player of said plurality of disk players when said comparing means has determined that said last address and said present address differ by a predetermined value or less.

2. A system as recited in claim 1, wherein said first applying applies said play instruction to said second selected disk player and applies a stop instruction to said first selected disk player when said comparing means has determined that said last address equals said present address.

3. A system as recited in claim 1, wherein said second applying means applies a play start position instruction to said second selected disk player when said comparing means has determined that said last address and said present address differ by said predetermined value or less.

4. A method of alternately operating a plurality of disk players, comprising the steps of:
   selecting one of a plurality of disk players and switching an output of said selected disk player to an output;
   applying a play start position instruction and a play instruction to a first selected disk player;
   comparing a present address read from a disk mounted in said first selected disk player with a last address of a last piece of data to be played by said first selected disk player, said last address being provided by a search operation in response to said play start position instruction; and
   applying a play start preparation instruction to a second selected disk player when said comparing step has determined that said last address and said present address differ by a predetermined value or less.

5. A method as recited in claim 4, further comprising applying a play instruction to said second selected disk player when said comparing step has determined that said last address equals said present address.

* * * * *